United States Patent
Ceccarelli et al.

(10) Patent No.: US 9,450,778 B2
(45) Date of Patent: Sep. 20, 2016

(54) P2MP TRAFFIC PROTECTION IN MPLS-TP RING TOPOLOGY

(75) Inventors: Daniele Ceccarelli, Genoa (IT); Francesco Fondelli, Calcinaia (IT); Diego Caviglia, Savona (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/512,781

(22) Filed: Jul. 30, 2009

(65) Prior Publication Data

US 2010/0214909 A1    Aug. 26, 2010

Related U.S. Application Data

(60) Provisional application No. 61/155,284, filed on Feb. 25, 2009.

(51) Int. Cl.
| | | |
|---|---|---|
| G01R 31/08 | (2006.01) | |
| H04L 12/437 | (2006.01) | |
| H04L 12/707 | (2013.01) | |
| H04L 12/703 | (2013.01) | |
| H04L 12/723 | (2013.01) | |

(52) U.S. Cl.
CPC ............. H04L 12/437 (2013.01); H04L 45/22 (2013.01); H04L 45/28 (2013.01); H04L 45/50 (2013.01); H04L 45/507 (2013.01)

(58) Field of Classification Search
CPC ................................................... H04W 12/26
USPC ................ 370/228, 252–253, 230–234, 258, 370/264–269, 389–427, 468–473
See application file for complete search history.

(56) References Cited

U.S. PATENT DOCUMENTS

| | | | | |
|---|---|---|---|---|
| 6,389,015 | B1 * | 5/2002 | Huang et al. | 370/376 |
| 7,042,839 | B2 * | 5/2006 | Stewart et al. | 370/227 |
| 7,545,735 | B1 * | 6/2009 | Shabtay et al. | 370/217 |
| 7,796,644 | B2 * | 9/2010 | Magill et al. | 370/468 |
| 2004/0221058 | A1 * | 11/2004 | de Boer et al. | 709/238 |
| 2008/0205272 | A1 * | 8/2008 | Vasseur et al. | 370/235 |

OTHER PUBLICATIONS

Yasukawa, S., "Signaling Requirements for Point-to-Multipoint Traffic-Engineered MPLS Label Switched Paths (LSPs)", RFC 4461. Apr. 2006.
Aggarwal, R., Papadimitriou, D., and S. Yasukawa, "Extensions to Resource Reservation Protocol—Traffic Engineering (RSVP-TE) for Point-to-Multipoint TE Label Switched Paths (LSPs)", RFC 4875. May 2007.
Pan, P., Swallow, G., and A. Atlas, "Fast Reroute Extensions to RSVP-TE for LSP Tunnels", RFC 4090, May 2005.

(Continued)

*Primary Examiner* — Iqbal Zaidi

(57) ABSTRACT

In a connection-oriented network a point-to-multipoint working path is established between a source node and a plurality of destination nodes using a number of working path intermediate nodes. A point-to-multipoint protection path is established for possible points of failure in the working path. Each protection path connects a first working path intermediate node upstream of a point of failure and destination nodes of the working path downstream of the first working path intermediate node. The point-to-multipoint protection path only connects to destination nodes of the working path and working path intermediate nodes which must be transited to reach the destination nodes of the working path.

15 Claims, 12 Drawing Sheets

(56) References Cited

OTHER PUBLICATIONS

Ghanwani, A., Pace, J., Srinivasan, V., Smith, A., and M. Seaman, "A Framework for Integrated Services Over Shared and Switched IEEE 802 LAN Technologies", RFC 2816, May 2000.
Mannie, E. and D. Papadimitriou, "Recovery (Protection and Restoration) Terminology for Generalized Multi-Protocol Label Switching (GMPLS)". RFC 4427. Mar. 2006.
Niven-Jenkins, B., "MPLS-TP Requirements", 2008-Draft.
Sprecher, N., "MPLS-TP OAM Analysis", 2008-Draft.
Bocci, M., "A Framework for MPLS in Transport Networks", 2008-Draft.
Jounay, F., "Requirements for Point-to-Multipoint Pseudowire", 2008-Draft.
Bradner, S., "Key words for use in RFCs to Indicate Requirement Levels", BCP 14, RFC 2119, Mar. 1997-Draft.

\* cited by examiner

-- FRR-TP --

A-B          B-A-F-E-D-C          [C]-[D]-E-[F]

Segment "upstream"    backup path         Segment "downstream"
with respect to                                    with respect to
the failure                                                the failure

-- ROM-FRR --

A-B (*)        B-A-[F]-E-[D]-[C] (@)

Segment "upstream"    backup path
with respect to
the failure

P2MP TRAFFIC PROTECTION IN MPLS-TP RING TOPOLOGY

CROSS-REFERENCE TO RELATED APPLICATIONS

This application claims the benefit of U.S. Provisional Application No. 61/155,284, filed Feb. 25, 2009, the disclosure of which is incorporated herein by reference.

TECHNICAL FIELD

This invention relates to protection switching for point-to-multipoint (P2MP) traffic paths in a connection-oriented network, such as a Generalised Multi-Protocol Label Switching (GMPLS), Multi-Protocol Label Switching (MPLS) or Multi-Protocol Label Switching Transport Profile (MPLS-TP) network.

BACKGROUND

Multi-Protocol Label Switching Transport Profile (MPLS-TP) is a joint International Telecommunications Union (ITU-T)/Internet Engineering Task Force (IETF) effort to include an MPLS Transport Profile (MPLS-TP) within the IETF MPLS architecture to support the capabilities and functionalities of a packet transport network as defined by ITU-T. In the MPLS-TP requirements draft [DRAFT-JENKINS] it is highlighted that an MPLS-TP architecture must allow a smooth migration from legacy networks (e.g. SONET/SDH) to packet transport networks and support, in a reliable way, the accelerating growth of packet-based services (such as VoIP, L2/L3 VPN, IPTV, RAN backhauling, etc.). That migration must be accomplished preserving carriers investments in both Capital Expenditure (CAPEX) and Operational Expense (OPEX) as much as possible. Most of the deployed SDH/SONET networks around the world are based on ring topologies, this assumption being especially true for Metro-Core and Metro-Access networks.

The most interesting applications leading the network transformation are point-to-multipoint (P2MP) applications, such as Internet Protocol Television (IPTV). It is desirable that MPLS-TP supports an efficient solution for P2MP applications over interconnected rings. It is also desirable that these applications have appropriate resiliency, such as recovery from at least a single node/link failure.

SUMMARY

A method of configuring protection for point-to-multipoint traffic in a connection-oriented network comprises establishing a point-to-multipoint working path between a source node and a plurality of destination nodes using a number of working path intermediate nodes. A point-to-multipoint protection path is established for a possible point of failure in the working path, the protection path connecting a first working path intermediate node upstream of the point of failure and destination nodes of the working path downstream of the first working path intermediate node. A point-to-multipoint protection path can be established for multiple points of failure in the working path, or for every possible point of failure in the working path.

An embodiment of the invention provides a network solution for MPLS or MPLS-TP ring based topology networks that supports reliable point-to-multipoint services. An embodiment of the invention addresses the bandwidth usage optimization of reliable P2MP traffic distribution (e.g. IPTV) over MPLS-TP networks based on interconnected ring topology (physical or logical). It is desirable that resiliency is based on recovery mechanisms able to restore traffic in about 50 ms, without usage of any control plane. Accordingly, the recovery mechanism does not rely on any control plane. The term "control plane" includes signaling and/or routing protocols such as the GMPLS Control Plane suite.

The functionality can be implemented by means of hardware comprising several distinct elements and by means of a suitably programmed processing apparatus. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to a processing apparatus via a network connection.

BRIEF DESCRIPTION OF THE DRAWINGS

Embodiments of the invention will be described, by way of example only, with reference to the accompanying drawings in which.

DETAILED DESCRIPTION

The solutions proposed for the distribution of P2MP traffic over ring networks, or interconnected ring networks (e.g. single node ring interconnection or dual node ring interconnection), can be based on P2MP LSPs [RFC 3031, RFC 4875] or P2MP PWE3s [draft-martini-pwe3-p2mp-pw-00].

The use of a P2MP LSP (label switched path) instead of many P2P LSPs reduces traffic replication and bandwidth utilization in the network. The solution for P2MP LSP described in [RFC4875] is enhanced in order to fully meet MPLS-TP P2MP ring distribution requirements. P2MP LSPs are provisioned via the management plane [RFC3812, RFC3813, draft-ietf-mpls-p2mp-te-mib-09] without control plane support and, advantageously, they provide protection switching mechanisms relying on MPLS-TP OAM in order to grant network survivability.

Figure 1:
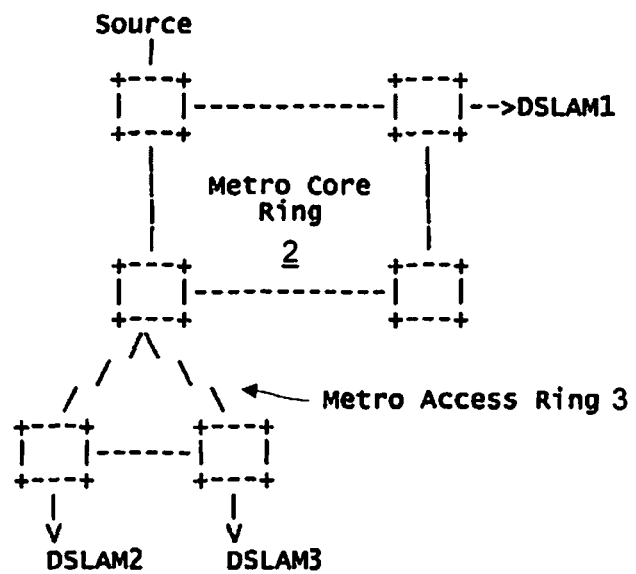
FIG. 1 shows an interconnected ring topology.

FIG. 1 illustrates a typical interconnected ring topology that can be found in metro networks. Of course, real topologies involve a larger number of rings and nodes. The source node can be a video server that distributes a P2MP video stream towards different destinations, typically Digital Subscriber Local Access Multiplexers (DSLAM). The use of redundant video servers located in different nodes is allowed. DSLAM1 is directly connected to the MetroCore ring 2 while DSLAM2 and DSLAM3 are connected to the Metro Access ring 3.

Figure 2:
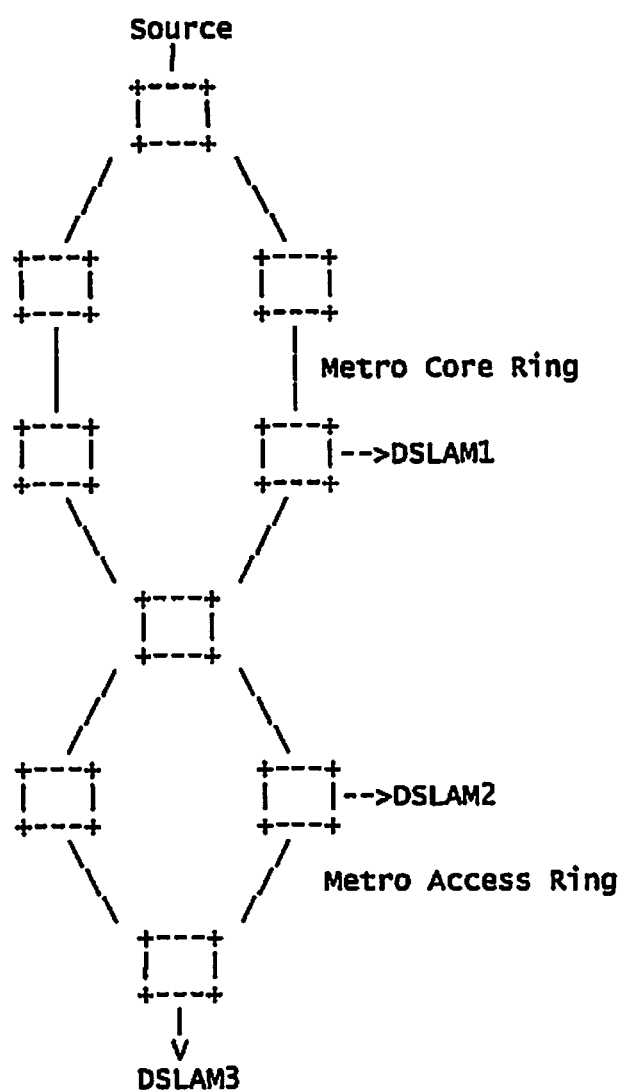
FIG. 2 shows a ring topology with a single interconnection node.
Figure 3:
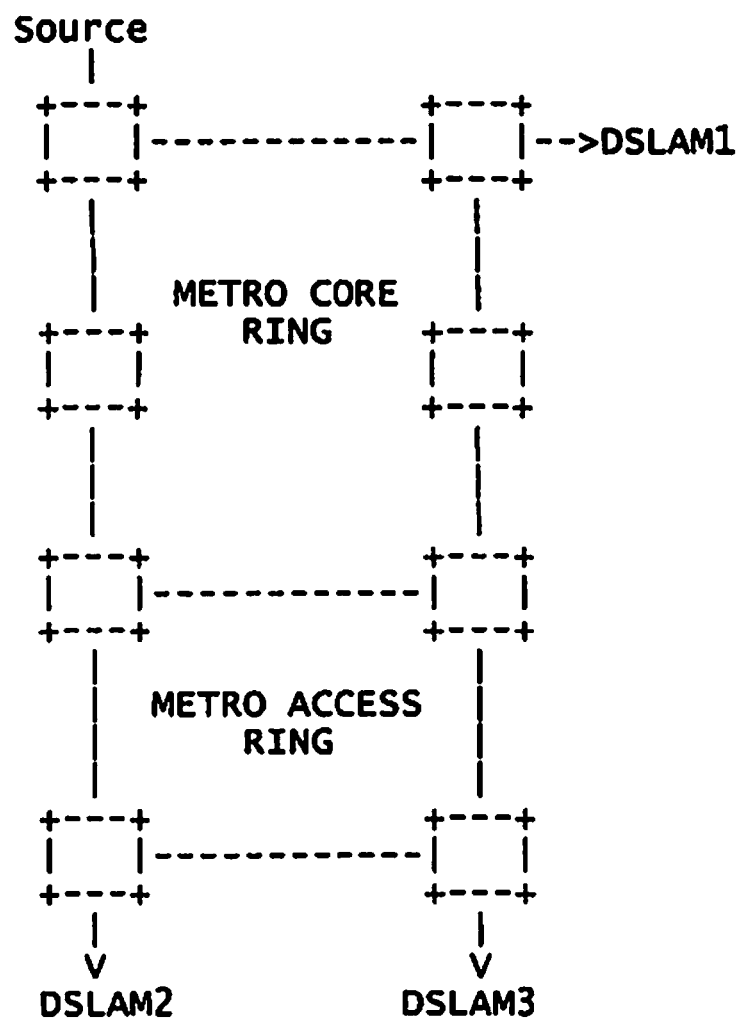
FIG. 3 shows a ring topology with two interconnection nodes.

Metro Area ring based networks are usually composed of a main Metro-Core ring 2 and several minor Metro-Access rings 3. The interconnection between such rings can use a single node, as shown in FIG. 2, or a couple of nodes which are spaced apart by one or more hops, as shown in FIG. 3. It is desirable that MPLS-TP solutions are based on interconnected ring architectures that were previously used by SONET/SDH in order to avoid the need to lay new fibers (very expensive, especially in Europe), or lease dark fibers, in metro areas and maintain low cost. The main requirements that should preferably be satisfied by a network in order to provide a reliable MPLS-TP based infrastructure for P2MP traffic transport are: P2MP traffic transport over an MPLS-TP network requirements [DRAFT-JENKINS], [DRAFT-BLB] and [DRAFT-SPRECHER].

It is advantageous that each node should minimize packet replication and packets should not be replicated on the same unidirectional physical path. It is advantageous that optimization criteria and algorithms applied to the working LSP should be respected/applicable also to the backup LSPs when the protection is activated.

It is advantageous that it should be possible to configure the protection switching in revertive or non-revertive mode [DRAFT-BLB]. It is advantageous that it should be possible to prevent frequent protection switching (i.e. by an appropriate application of Hold off and Wait To Restore timers) [DRAFT-JENKINS]. Manual commands should be supported [DRAFT-JENKINS]. It is advantageous that a network has a set of resilience mechanisms and that these mechanisms should not rely on the control plane. Protection mechanisms and control plane based resilient mechanisms can coexist [DRAFT-JENKINS].

In this section two different recovery schemes based on the Fast Rerouting (FRR) technique are analyzed and compared. The first scheme is called FRR-TP (Fast Rerouting-Transport Profile) because it is mainly based on the rerouting of the failed portion of the network through a pre-provisioned path and exploits OAM functionalities. The second one is called ROM-FRR (Ring Optimized Multicast-Fast ReRouting) due to the fact that, despite being applicable to any kind of network, it is optimized for the distribution of multicast traffic over ring networks. The two different recovery schemes will be compared and pros and cons of each one will be highlighted. The solutions are data plane driven and are thought to be able to work in the absence of a control plane.

Fast Rerouting (FRR)

[RFC4875] describes procedures to perform Fast Rerouting operations for P2MP LSPs using extensions defined in [RFC4090]. The FRR mechanism is based on the re-direction of traffic flows on backup LSPs as soon as a failure is detected. This switch is extremely fast due to the fact that the backup LSPs are computed and provisioned before the failure detection and the traffic is re-directed as close to the failure point as possible. It is possible to reach switching times of tens of milliseconds because no path computation and set-up are performed and the failure notification must not be propagated to the ingress LER.

In [RFC4090] two different methods are defined: one-to-one and facility backup. The first method foresees the creation of a detour LSP for each protected LSP at each potential point of local repair, while the second one creates a bypass tunnel to protect a set of LSPs with similar backup constraints.

Both of these methods are based on the assumption that each LSR of the protected LSP is a Merge Point (MP), that is, it must be able to rejoin the backup LSP to the protected one downstream of the potential failure.

Fast Rerouting-Transport Profile (FRR-TP)

Both one-to-one and facility backup can be used as recovery mechanisms for P2MP LSPs in MPLS-TP interconnected ring topology networks but they need to be extended in order to fully meet MPLS-TP protection requirements. This solution will be called FRR-TP.

Advantageously, MPLS-TP OAM is used on each MPLS section to perform Continuity Check (CC) operations. When a defect is detected, a hold-off timer (with period configurable from 1 to 10s in steps of 100 ms) should be started in order to prevent frequent protection switches. When the timer expires and a defect condition is still present, the protection switching should be initiated.

Externally initiated commands may be provided for manual control of protection switching on each PLR. The following externally initiated commands should be supported: Clear, Lockout of Protection, Forced Switch, Manual Switch, and Exercise.

Figure 4:
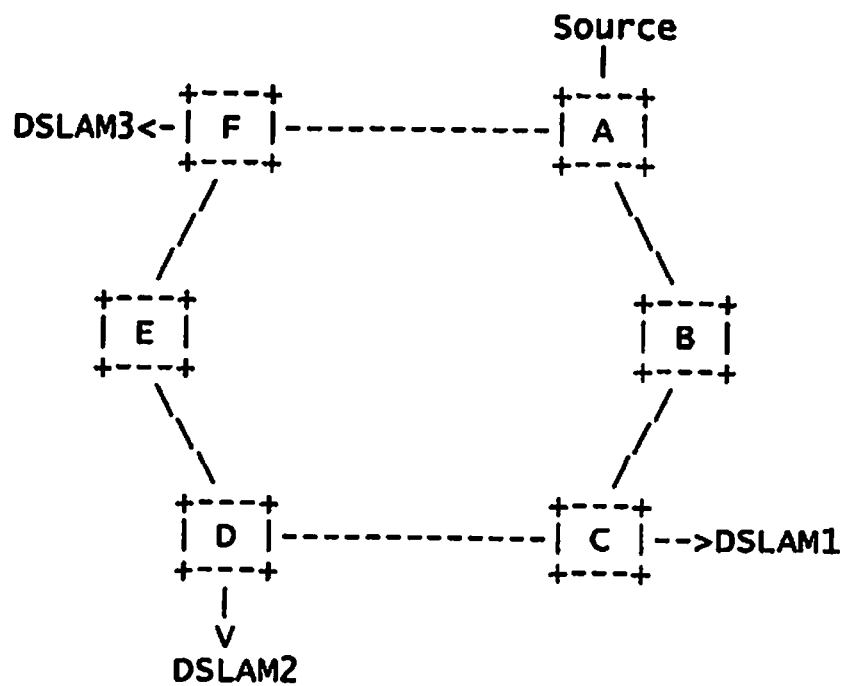
FIG. 4 shows a single ring topology with a P2MP traffic path.

FIG. 4 shows an example of a ring topology with a P2MP LSP. The source of the P2MP traffic flow is connected to node A and a P2MP LSP is created with A as ingress node (i.e. root of the multicast tree) and C, D and F as egress nodes (i.e. leaves of the multicast tree) in order to deliver traffic to the different DSLAMs. In the following table it is possible to see the protected LSP and a list of the possible backup LSPs in case of link protection and node protection configuration. "X's Backup" is the backup path activated by X as a consequence of a failure affecting node Y (downstream node with respect to X) or link X-Y, and square brackets [ ] indicate nodes delivering traffic to DSLAMs.

TABLE 1

| Protected LSP: | A->B->[C]->[D]->E->[F] |
|---|---|
| | LINK PROTECTION |
| A's Backup: | A->F->E->D->C->B |
| B's Backup: | B->A->F->E->D->C |
| C's Backup: | C->B->A->F->E->D |
| D's Backup: | D->C->B->A->F->E |
| E's Backup: | E->D->C->B->A->F |
| | NODE FAILURE |

TABLE 1-continued

| | |
|---|---|
| A's Backup: | A->F->E->D->C |
| B's Backup: | B->A->F->E->D |
| C's Backup: | C->B->A->F->E |
| D's Backup: | D->C->B->A->F |
| E's Backup: | E->D->C->B->A |

Figure 5:
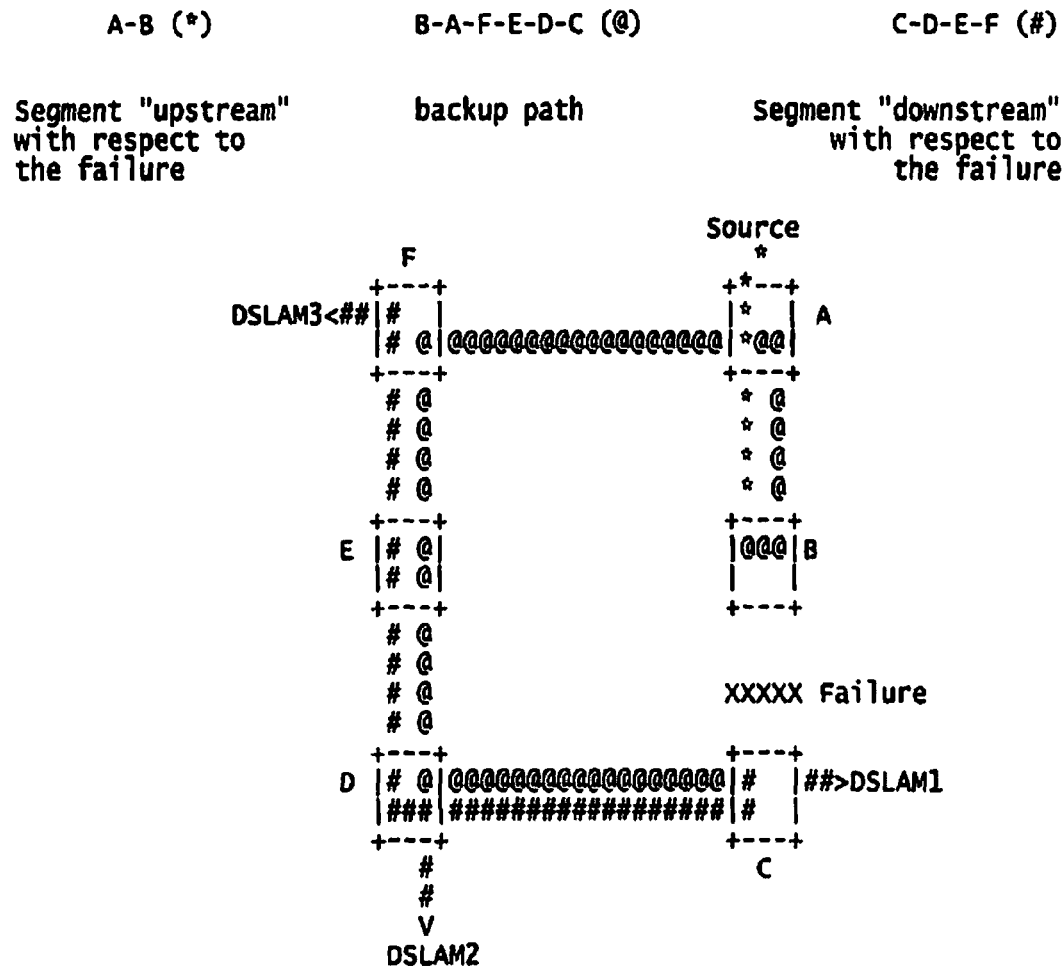
FIG. 5 shows how a FRR-TP method operates in response to a link failure in the network of FIG. 4.
Figure 6:
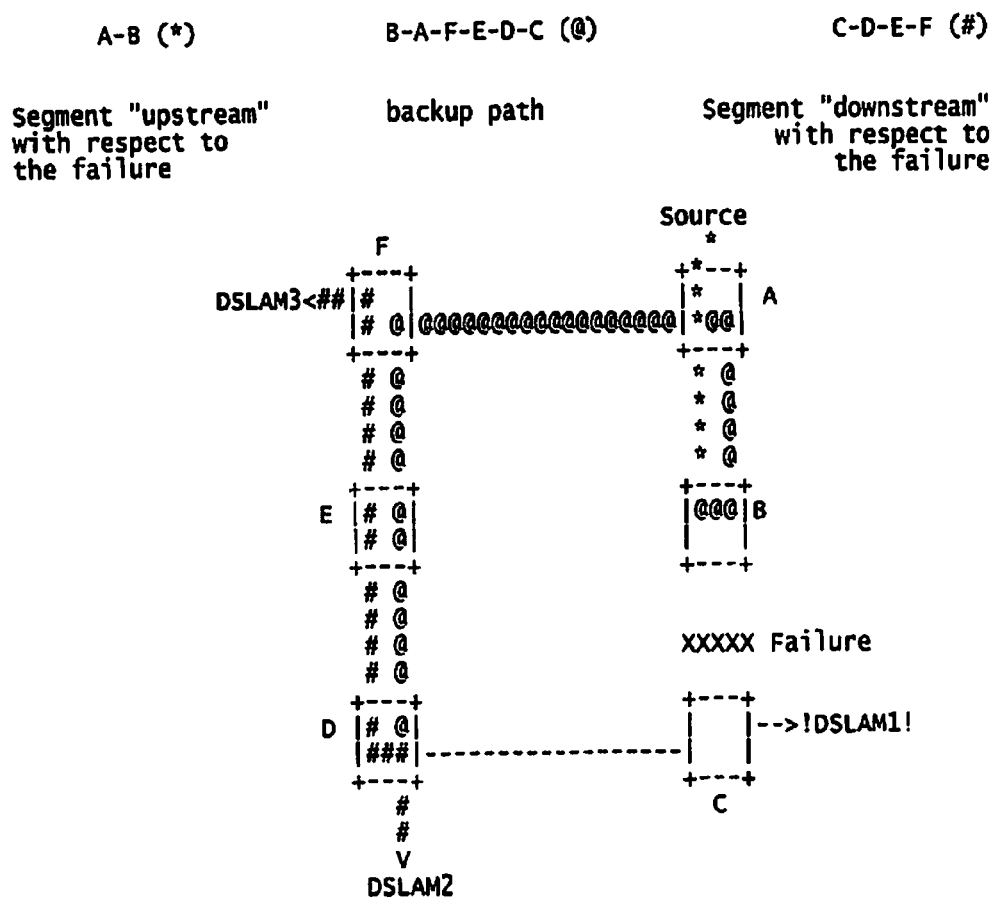
FIG. 6 shows how a FRR-TP method operates in response to a node failure in the network of FIG. 4.

In the case of a failure on link B-C, and considering link failure configuration, the protected LSP is locally rerouted by B to C using the pre-computed and set-up LSP depicted in Table 1. Considering that the network has a ring topology, the only other way of reaching C is moving counterclockwise and establishing an alternative path from B to C through A, F, E, D and C. Once C has been reached, the traffic is re-joined to the protected LSP and delivered down to D, E and F. FIG. 5 shows the list of nodes crossed by the traffic flow in case of failure on link B-C. This example shows that the use of the FRR-TP method in ring topology networks is not optimized in terms of bandwidth utilization and number of hops to be crossed. The traffic flows through the same links more than once and, in this particular case, all links are used twice. Further considerations concerning bandwidth utilization are given later.

This recovery mechanism has a limitation when providing node protection. In such a case, even if a failure affects a link, the protection assumes that the failure affects the downstream node and the backup path is redirected to the following node.

It is possible to show this limitation considering the previous example in case node protection is configured. A failure affects link B-C. The recovery mechanism assumes that node C has failed. B redirects traffic towards node D (i.e. merge point) through the appropriate LSP (i.e. [B, A, F, E, D]), then node C is excluded even if it is perfectly functioning and even if the network has enough resources to reach it.

Optimized Multicast Fast Rerouting (ROM-FRR)

ROM-FRR is a P2MP recovery mechanism based on FRR. It behaves in the same manner as FRR-TP with the difference that it does not provide a backup path between the end nodes of a failed link (link protection) or between the upstream and downstream node of a failed node (node protection), but a backup P2MP LSP from the upstream node with respect to the failure and all the destinations downstream of the failure.

Considering again the example ring network depicted in FIG. 4, Table 2 shows the protected LSP and all the possible backup LSPs. "X's Backup" is the backup path activated by X as a consequence of a failure affecting node Y (downstream node with respect to X) or link X-Y, and square brackets indicate nodes delivering traffic to the DSLAMs.

TABLE 2

| | |
|---|---|
| Protected LSP: | A->B->[C]->[D]->E->[F] |
| LINK/NODE PROTECTION | |
| A's Backup: | A->[F]->E->[D]->[C] |
| B's Backup: | B->A->[F]->E->[D]->[C] |
| C's Backup: | C->B->A->[F]->E->[D] |
| D's Backup: | D->C->B->A->[F] |
| E's Backup: | E->D->C->B->A->[F] |

ROM-FRR can be applied to any network topology but it is particularly efficient for interconnected ring topologies.

Figure 7:
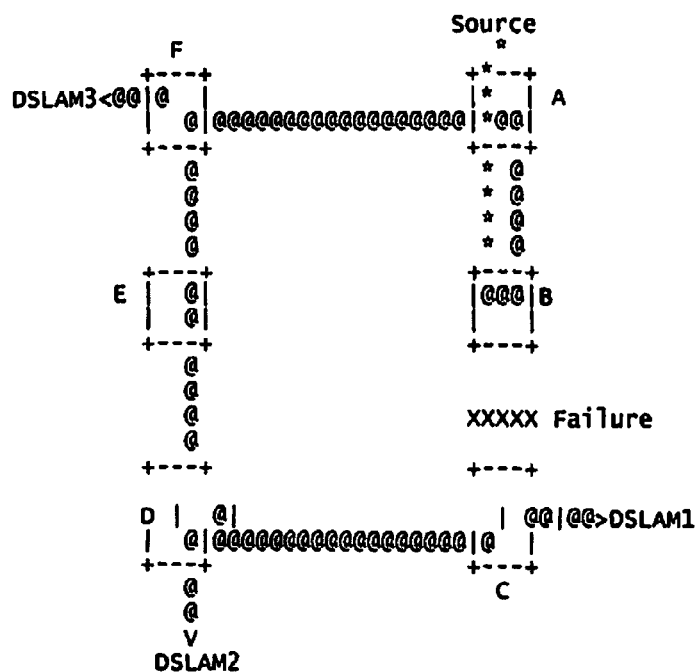
FIG. 7 shows a comparison between FRR-TP and ROM-FRR methods in response to a failure in the network of FIG. 4.

FIG. 7 shows an example which compares the application of the FRR-TP and ROM-FRR protection techniques. The network has the ring topology previously considered, and the failure is considered to occur on link B-C. FIG. 7 shows the list of nodes involved in the protection highlighting, using brackets, the nodes that drop and continue traffic from the ring.

Comparing the two lists of nodes, it is possible to see that in this particular case the number of hops crossed using FRR-TP is significantly higher than the number of hops made by the traffic when ROM-FRR is used (generally it is always higher or at least equal). There is a waste of bandwidth on all those links that are crossed in both directions. FRR-TP is configured to respond to a specific failure: link failure or node failure. If the protection is configured to react to a node failure, but the failure affects a link, this results in isolating node C so, failing to feed DSLAM1. This problem does not happen in the case of ROM-FRR because there is no distinction between node protection and link protection. In case of failure of link B-C or node C, the rerouting performed in both cases attempts to reach C. If the failure regards the link, the traffic is correctly delivered to C, while if the failure affects node C, the rerouting is correctly performed up to node D.

Advantageously, the protection of the P2MP traffic should provide a switching time within 50 ms. This means that the P2MP traffic must be recovered, in case of either link or node failure, within 50 ms from the fault detection.

The FRR-TP and ROM-FRR methods are transparent to the destination nodes, which behave as normal without any special configuration. In operation, a destination node will receive traffic via the working path and, following failure and switching to the protection (backup) path, will then receive traffic via the protection (backup) path.

Bandwidth Utilization Comparison

Considering the ring network previously seen, it is possible to make some bandwidth utilization considerations. The protected LSP is set up from A to F clockwise and an X Mbps bandwidth is reserved along the path. All of the backup LSPs are pre-provisioned counterclockwise, each of them with reserved bandwidth X. These LSPs share the same bandwidth in a SE (Shared Explicit) [RFC 2205] style.

The bandwidth reserved counterclockwise is not used when the protected LSP is properly working and can be used for extra traffic [see RFC 4427].

In case of failure, the bandwidth actually used differs depending on the recovery mechanism implemented. In case of FRR-TP, the bandwidth used is X on both directions of almost each link, while in case of ROM-FRR only the links from the ingress node to the node detecting the failure have an X bandwidth used in both directions, while all the others have an X bandwidth utilization only in the counterclockwise direction.

Consider a failure on link B-C shown in FIG. 4. In the following table it is possible to find the Bandwidth utilization on each link (always equal to X), for each recovery mechanism and for each direction (CW=clockwise, CCW=counterclockwise).

Multiple Failures Comparison

A further comparison between FRR-TP and ROM-FRR can be made with respect to their ability to react to multiple failures. The FRR-TP recovery mechanism does not have the ability to recover from multiple failures on a ring network, while ROM-FRR is able to recover from multiple failures.

Consider, for example, a double link failure affecting links B-C and C-D shown in FIG. 4. The FRR-TP mechanism is not able to recover from the failure because B, upon detecting the failure, has no alternative paths to reach C. The whole P2MP traffic is lost. ROM-FRR mechanism is able to partially recover from the failure, in fact the backup P2MP LSP to node F and node D is correctly set up and DSLAMs 2 and 3 continue receiving traffic.

The comparison of the FRR-TP and ROM-FRR methods leads to the following conclusions:
1. ROM-FRR allows a sensible saving of bandwidth. With respect to FIG. 7 it is possible to see that only the links from the ingress node to the failure (clockwise) are crossed in both ways (A-B), while all the other ones (from the ingress to failure, counterclockwise) are crossed just once (F-E-D-C).
2. The average number of hops crossed using FRR-TP is significantly higher as a consequence of the previous bullet. In the example shown in FIG. 7, the "farthest" node is reached in 9 hops using FRR-TP and only 6 hops using ROM-FRR. In general the number of hops is always lower (or equal in the worst case) using ROM-FRR.
3. FRR-TP must be configured in node protection or link protection mode. This leads to a bug in case of link failure and node protection configured, when the node supposed to be failed is perfectly working but is isolated.
4. FRR-TP is not able to react to multiple failures, while ROM-FRR is able to partially recover from multiple failures, depending on the resources affected.

Figure 8:
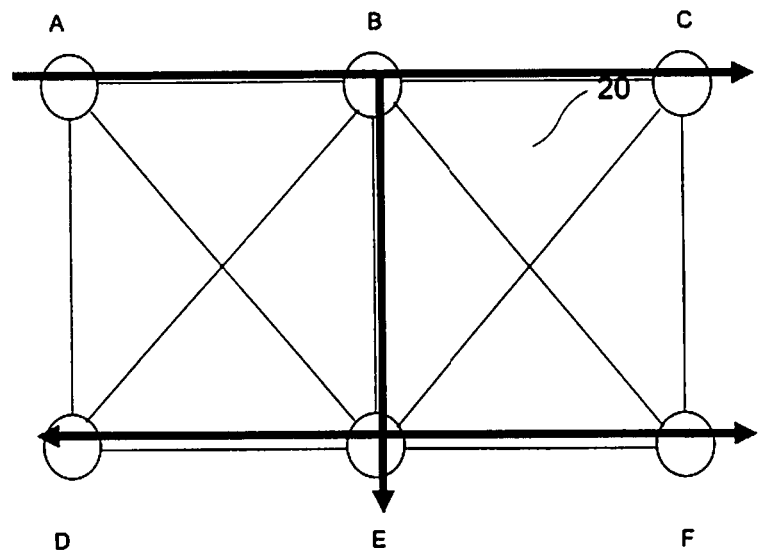
FIG. 8 shows a meshed network topology with a P2MP traffic path.
Figure 9:
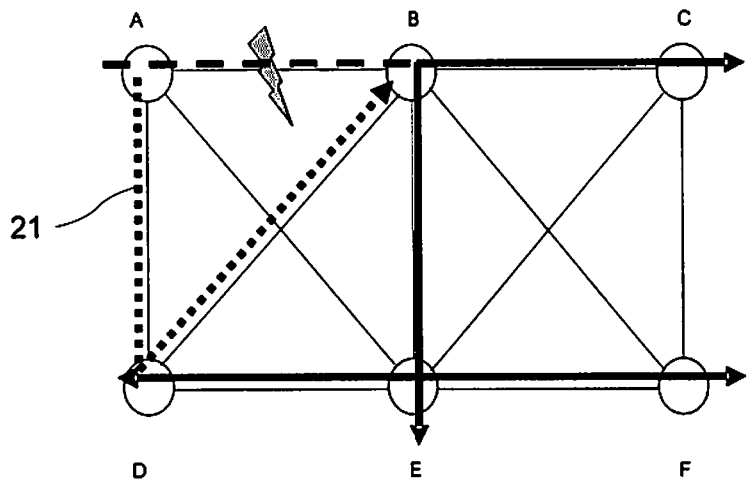
FIGS. 9 and 10 show how a FRR-TP method operates in response to a node failure in the network of FIG. 8.
Figure 10:
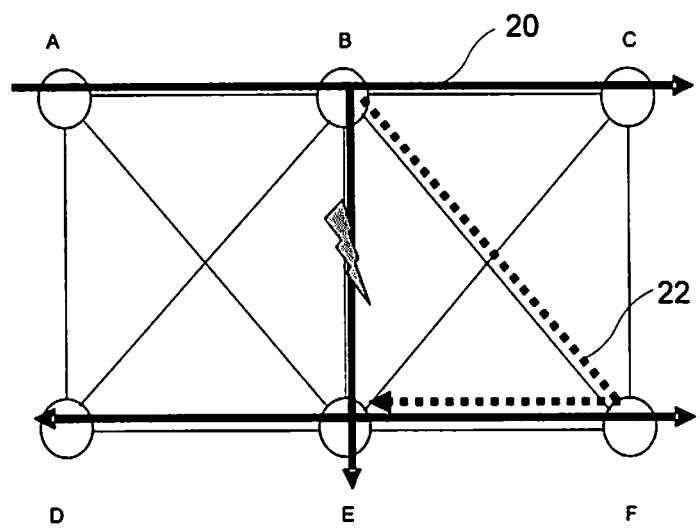

ROM-FRR is applicable to non-ring network topologies but it is best applied to ring networks, where the alternative path is just one and it is possible to share the bandwidth of all the protection paths on it. FIG. 8 shows a meshed network with a P2MP LSP 20 having a root at node A and destination nodes C, D, E and F. Application of FRR or FRR-TP to LSP 20 means having a "detour" (a P2P LSP between the two nodes adjacent to the failure) for each point of failure. FIG. 9 shows a first point of failure on the link A-B. If the link between A and B fails, the FRR finds an alternative path from A to B (let's say A-D-B) 22 and then the detour is merged at node B to the remainder of LSP 20. FIG. 10 shows a failure on link B-E and a detour 22 from B to E via the route B-F-E. As before, the traffic is merged at node E to the remainder of the LSP 20.

It can be seen that node D in the first example and node F in the second example receive the traffic through the detours but are not able to "extract" and deliver traffic. Moreover, in the second example, link E-F is crossed twice (from F to E and from E to F).

Figure 11:
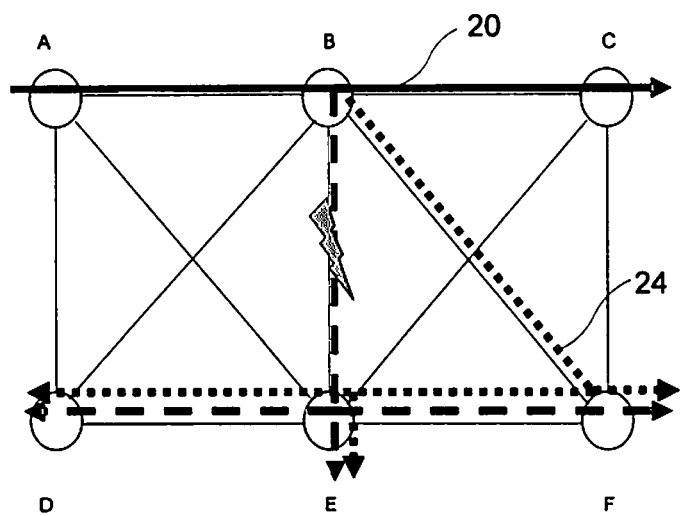
FIG. 11 shows how a ROM-FRR method operates in response to a node failure in the network of FIG. 8.

FIG. 11 shows a protection path for the same failure on link B-E using ROM-FRR. ROM-FRR does not provide a detour from B to E to reconnect to the tail part of the P2MP LSP 20 but, instead, creates a new P2MP LSP from node B to all of the destination nodes served by the original LSP 20, downstream of the point of failure. A possible protection path 24 is shown in FIG. 11. Traffic is delivered to node C by the working path LSP 20 while the nodes D, E, F downstream with respect to the failure are served by the protection path LSP 24. In this case the delivery of the traffic is optimized both in terms of number of hops and bandwidth optimization.

Figure 12:
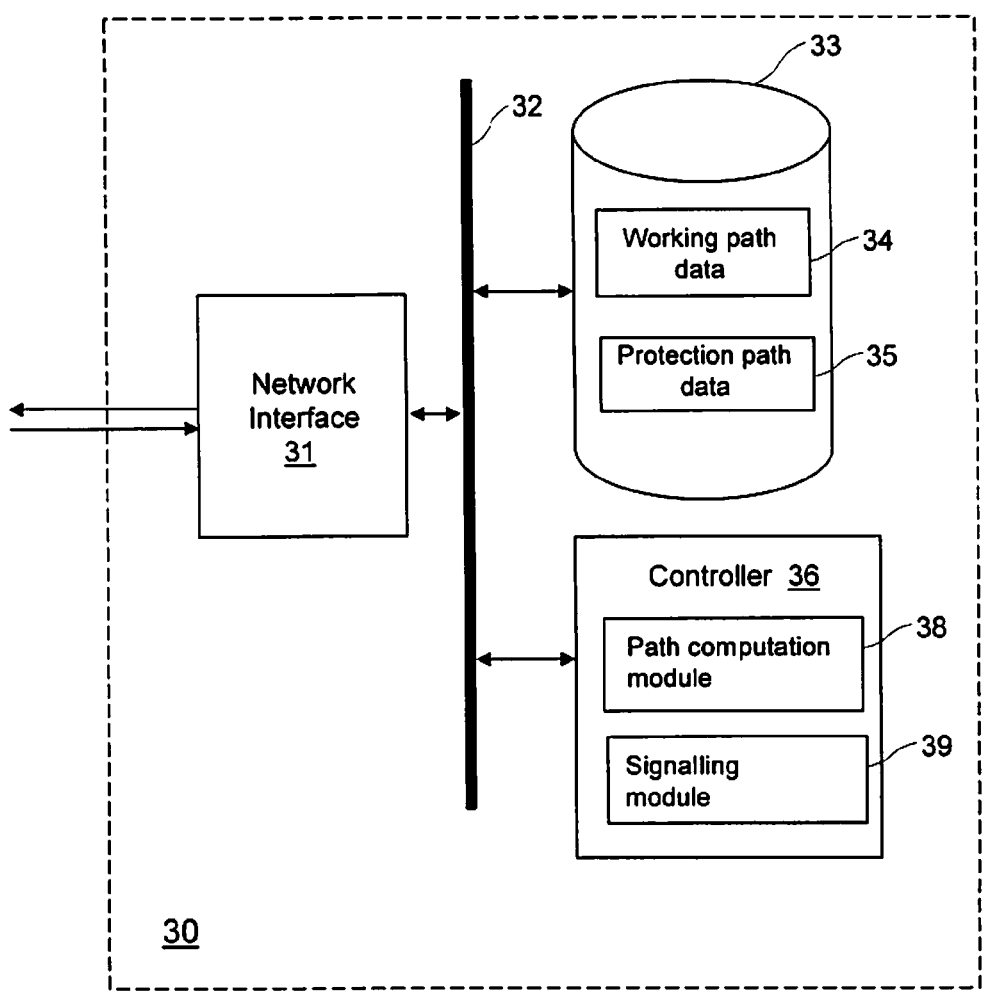
FIG. 12 shows apparatus at a network management system.

FIG. 12 schematically shows apparatus at a network management entity 30 which forms part of a management plane of the network. The entity 30 has a network interface 31 for sending and receiving signalling messages to nodes in the network. A system bus 32 connects the network interface 31 to storage 33 and a controller 36. Storage 33 stores control data 34, 35 for the network. Controller 36 comprises a path computation module 38 which computes a routing for the working path and protection paths. A signalling module 39 interacts with nodes to instruct them to store forwarding instructions to implement the working path and protection paths.

Figure 13:
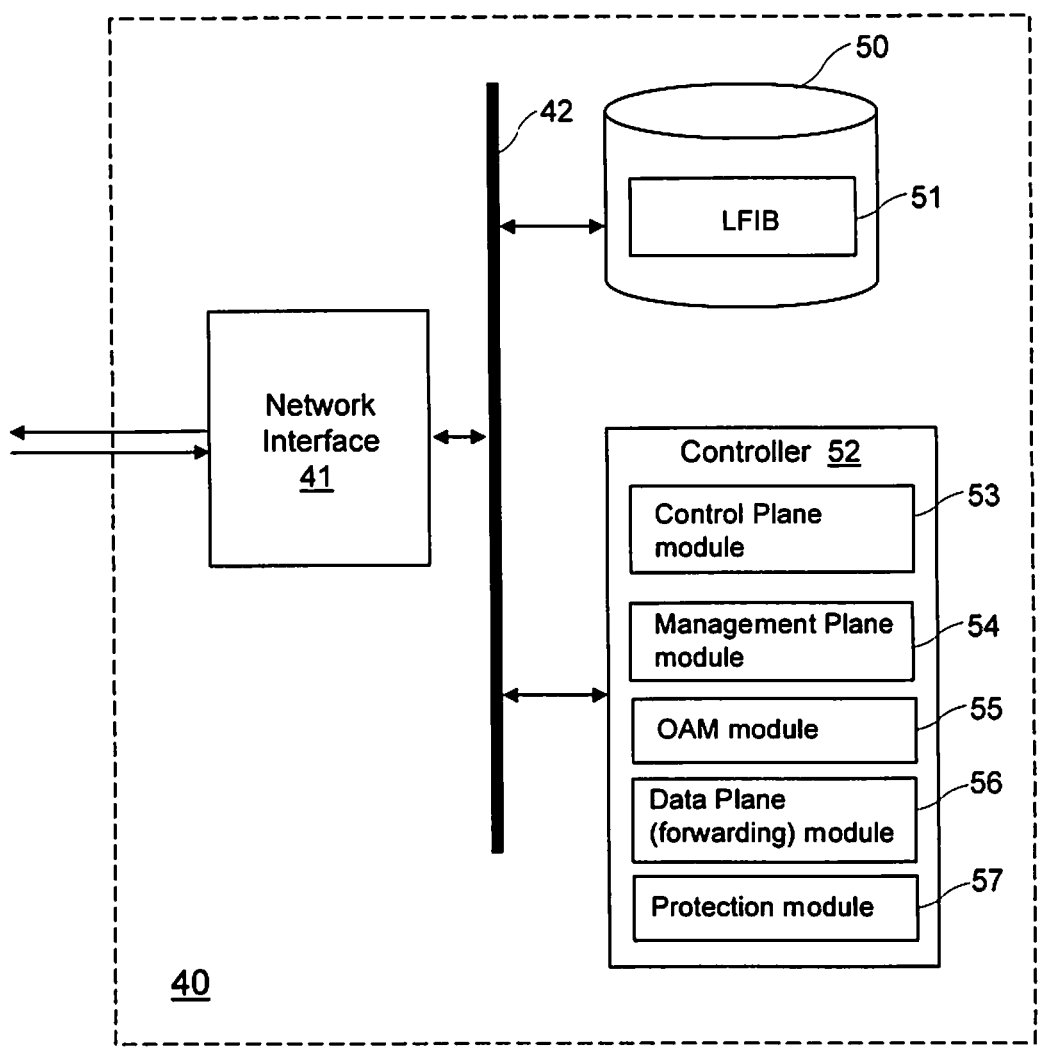
FIG. 13 shows apparatus at a network node.

FIG. 13 schematically shows a LSR 40 at a network node. The LSR 40 has a network interface 41 for receiving transport units (e.g. packets or frames of data) from other LSRs. Network interface 41 can also receive signalling messages from a NMS. A system bus 42 connects the network interface 41 to storage 50 and a controller 52. Storage 50 provides a temporary storage function for received packets before they are forwarded. Storage 50 also stores control data 51 which controls the forwarding behaviour of the LSR 40. In IETF terminology, the forwarding data 51 is called a Label Forwarding Information Base (LFIB).

Controller 52 comprises a set of functional modules 53-57 which control operation of the LSR. A Control Plane module 53 exchanges signalling and routing messages with other network nodes and can incorporate functions for IP routing and Label Distribution Protocol. Module 53 can support RSVP-TE signalling, allowing the LSR 40 to signal to other nodes to implement the traffic restoration operation by signalling the occurrence of a fault and activating a required backup LSP. A Management Plane module 54 performs signalling with a Network Management System. Advantageously, the Management Plane module 54 receives instructions from the Network Management System to set up the working path and backup path. An OAM module 55 supports OAM functionalities, such as Continuity Check signalling, to detect the occurrence of a link or node failure. A Data Plane forwarding module 56 performs label look up and switching to support forwarding of received transport units (packets). The Data Plane forwarding module 56 uses the forwarding data stored in the LFIB 51. A Protection module 57 performs functions of controlling the switching of traffic to the backup path when a failure is detected The modules can be implemented as hardware, or a combination of hardware and software. Although the functionality of the apparatus are shown as set of separate modules, it will be appreciated that a smaller, or larger, set of modules can perform the functionality.

Figure 14:
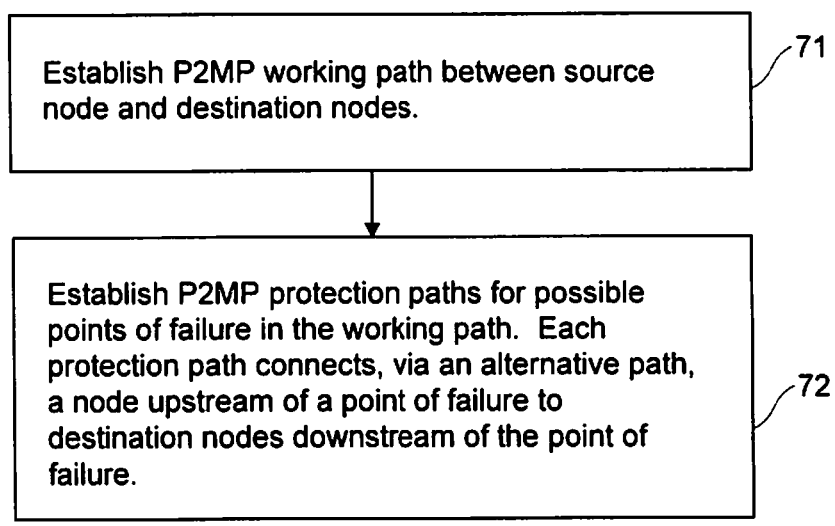
FIG. 14 shows steps of a method of configuring protection switching in a network.

FIG. 14 summarises the steps of a method for configuring ROM-FRR protection switching in a network. At step 71 a P2MP working path is established between a source node and destination nodes. At step 72 a set of P2MP protection paths are configured for possible points of failure in the network. Each P2MP protection path connects a node just upstream of the point of failure to destination nodes downstream of the point of failure.

Figure 15:
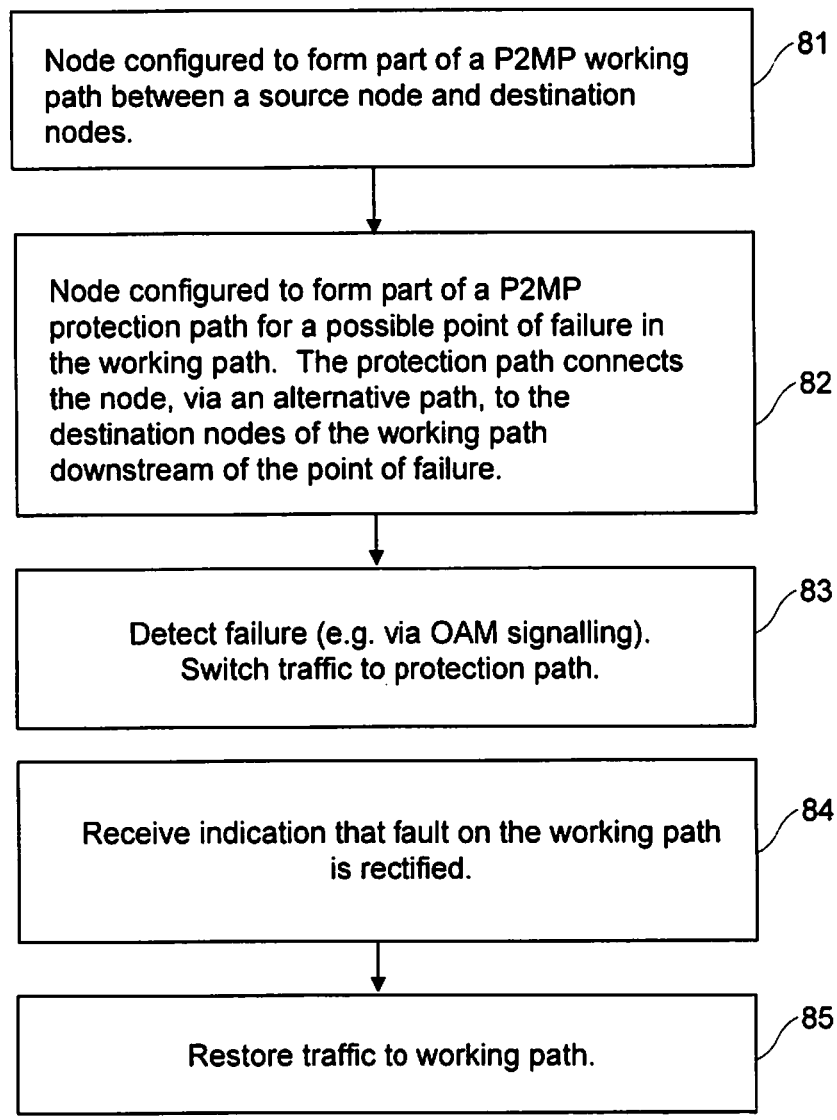
FIG. 15 shows steps of a protection switching method performed at a node.

FIG. 15 summarises the steps of the ROM-FRR method for protection switching, as performed at a node along the working path. At step 81 a P2MP working path is established between a source node and destination nodes via the node. At step 82 the node is configured to form part of a P2MP protection path for a possible point of failure in the working path. The protection path connects the node, via an alternative path, to the destination nodes of the working path downstream of the point of failure. At step 83 a node detects a failure, such as via MPLS-TP Section monitoring or simply because the used server layer goes operative down. The node then switches traffic to the protection path. At step 84, which occurs some time after step 83, the node receives an indication that the working path is functional. At step 85 the node restores traffic back to the working path.

REFERENCES

[RFC4461] Yasukawa, S., "Signaling Requirements for Point-to-Multipoint Traffic-Engineered MPLS Label Switched Paths (LSPs)", RFC 4461, April 2006.

[RFC4875] Aggarwal, R., Papadimitriou, D., and S. Yasukawa, "Extensions to Resource Reservation Protocol-Traffic Engineering (RSVP-TE) for Point-to-Multipoint TE Label Switched Paths (LSPs)", RFC 4875, May 2007.

[RFC4090] Pan, P., Swallow, G., and A. Atlas, "Fast Reroute Extensions to RSVP-TE for LSP Tunnels", RFC 4090, May 2005.

[RFC2816] Ghanwani, A., Pace, J., Srinivasan, V., Smith, A., and M. Seaman, "A Framework for Integrated Services Over Shared and Switched IEEE 802 LAN Technologies", RFC 2816, May 2000.

[RFC4427] Mannie, E. and D. Papadimitriou, "Recovery (Protection and Restoration) Terminology for Generalized Multi-Protocol Label Switching (GMPLS)", RFC 4427, March 2006.

[DRAFT-JENKINS] Niven-Jenkins, B., "MPLS-TP Requirements", 2008.

[DRAFT-SPRECHER] Sprecher, N., "MPLS-TP OAM Analysis", 2008.

[DRAFT-BLB] Bocci, M., "A Framework for MPLS in Transport Networks", 2008.

[DRAFT-PWE3-P2MP] Jounay, F., "Requirements for Point-to-Multipoint Pseudowire", 2008.

INFORMATIONAL REFERENCE

[RFC2119] Bradner, S., "Key words for use in RFCs to Indicate Requirement Levels", BCP 14, RFC 2119, March 1997.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

We claim:

1. A method of configuring protection for point-to-multipoint traffic in a connection-oriented network, based on a ring topology, the method comprising:
   configuring a number of working path intermediate nodes to establish a point-to-multipoint working path between a source node and a plurality of destination nodes using the working path intermediate nodes; and
   configuring at least one of the working path intermediate nodes and/or destination nodes to establish a point-to-multipoint protection path over a plurality of links, wherein the point-to-multipoint protection path is for a possible point of failure in the working path, the point-to-multipoint protection path connecting a first working path intermediate node upstream of the point of failure with all destination nodes served by the working path downstream of the point of failure,
   wherein the first working path intermediate node is between the point of failure and the source node, such that the point-to-multipoint protection path extends from the first working path intermediate node between the point of failure and the source node to all of the destination nodes downstream of the point of failure.

2. A method according to claim 1 wherein there is a single point-to-multipoint protection path associated with a link failure and a node failure at the point of failure.

3. A method according to claim 1 wherein the point-to-multipoint protection path only connects to destination nodes of the working path and intermediate nodes which must be transited to reach the destination nodes of the working path.

4. A method according to claim 1 wherein the step of establishing a point-to-multipoint protection path comprises establishing a point-to-multipoint protection path for each of a plurality of possible points of failure in the working path.

5. A method according to claim 1 wherein the step of establishing a point-to-multipoint protection path comprises cross-connecting resources at each protection path intermediate node to form the protection path.

6. A method according to claim 1 further comprising:
   determining a failure downstream of the first working path intermediate node; and
   switching traffic at the first working path intermediate node to the point-to-multipoint protection path.

7. A method according to claim 1, wherein the working path and protection path are established using a Multi-Protocol Label Switching (MPLS) or Multi-Protocol Label Switching Transport Profile (MPLS-TP) connection.

8. A method of protection switching in a connection-oriented network, based on ring topology, in which a number of working path intermediate nodes are configured to establish a point-to-multipoint working path between a source node and a plurality of destination nodes using the working path intermediate nodes, wherein the method is performed at a first one of the intermediate nodes along the working path downstream of the source node, the method comprising:
   determining a failure downstream of the first intermediate node; and
   switching traffic at the first intermediate node to a point-to-multipoint protection path, pre-established before the failure over a plurality of links by configuration of at least one of the working path intermediate nodes and/or destination nodes, the point-to-multipoint protection path connecting the first working path intermediate node to all destination nodes served by the working path downstream of the failure, such that the switched traffic is directed along the point-to-multipoint protection path from the first working path intermediate node between the failure and the source node to all of the destination nodes downstream of the failure.

9. A method according to claim 8 wherein there is a single point-to-multipoint protection path associated with a link failure and a node failure downstream of the point-to-multipoint first intermediate node.

10. A method according to claim 8 wherein the point-to-multipoint protection path only connects to destination nodes of the working path and working path intermediate nodes which must be transited to reach the destination nodes of the working path.

11. A method according to claim 8, wherein the working path and protection path are established using a Multi-Protocol Label Switching (MPLS) or Multi-Protocol Label Switching Transport Profile (MPLS-TP) connection.

12. A controller for a connection-oriented network, based on ring topology, comprising a plurality of nodes, the control entity being arranged to:
   configure a number of working path intermediate nodes to establish a point-to-multipoint working path between a source node and a plurality of destination nodes using the working path intermediate nodes; and
   configure at least one of the working path intermediate nodes and/or destination nodes to establish a point-tomultipoint protection path over a plurality of links, wherein the point-to-multipoint protection path is for a possible point of failure in the working path, the point-to-multipoint protection path connecting a first working path intermediate node upstream of the point of failure with all destination nodes served by the working path downstream of the point of failure, wherein the first working path intermediate node is between the point of failure and the source node, such that the point-to-multipoint protection path extends from the first working path intermediate node between the point of failure and the source node to all of the destination nodes downstream of the point of failure.

13. A non-transitory machine-readable medium comprising instructions which, when executed by a processor, causes the processor to perform a method of configuring a connection-oriented network, based on ring topology, to provide protection for point-to-multipoint traffic, the method comprising:

configuring a number of working path intermediate nodes to establish a point-to-multipoint working path between a source node and a plurality of destination nodes using the working path intermediate nodes; and configuring at least one of the working path intermediate nodes and/or destination nodes to establish a point-to-multipoint protection path over a plurality of links, wherein the point-to-multipoint protection path is for a possible point of failure in the working path, the point-to-multipoint protection path connecting a first working path intermediate node upstream of the point of failure and with all destination nodes served by the working path downstream of the point of failure, wherein the first working path intermediate node is between the point of failure and the source node, such that the point-to-multipoint protection path extends from the first working path intermediate node between the point of failure and the source node to all of the destination nodes downstream of the point of failure.

14. An apparatus for use at a node of a connection-oriented network, based on ring topology, the apparatus comprising:

a processor; and a memory containing instructions that, when executed by the processor, cause the apparatus to:

receive instructions to configure the node to form part of a point-to-multipoint working path between a source node and a plurality of destination nodes via a number of working path intermediate nodes;

receive instructions to configure the node to form part of a point-to-multipoint protection path connecting the node to all destination nodes served by the working path downstream of a possible point of failure in the working path;

determine a failure downstream of the node; and switch traffic to the point-to-multipoint protection path protection path when a failure is determined, such that the switched traffic is directed along the point-to-multipoint protection path from the node to all of the destination nodes downstream of the failure.

15. A non-transitory machine-readable medium comprising instructions which, when executed by a processor at a node in a connection-oriented network, based on ring topology, cause the processor to perform a method comprising:

determining a failure in a point-to-multipoint working path which has been established between a source node and a plurality of destination nodes via a number of working path intermediate nodes, the failure being downstream of the node; and switching traffic at the node to a point-to-multipoint protection path which has been pre-established before the failure over a plurality of links by configuration of at least one of the working path intermediate nodes and/or destination nodes, the point-to-multipoint protection path connecting the node to all destination nodes served by the working path downstream of the failure, such that the switched traffic is directed along the point-to-multipoint protection path from the first working path intermediate node between the failure and the source node to all of the destination nodes downstream of the failure.

* * * * *

UNITED STATES PATENT AND TRADEMARK OFFICE
CERTIFICATE OF CORRECTION

PATENT NO. : 9,450,778 B2
APPLICATION NO. : 12/512781
DATED : September 20, 2016
INVENTOR(S) : Ceccarelli et al.

It is certified that error appears in the above-identified patent and that said Letters Patent is hereby corrected as shown below:

In Column 8, Line 34, delete "detected" and insert -- detected. --, therefor.

In Column 12, Lines 14-15, in Claim 14, delete "protection path protection path" and insert -- protection path --, therefor.

Signed and Sealed this
Thirteenth Day of June, 2017

Joseph Matal
*Performing the Functions and Duties of the
Under Secretary of Commerce for Intellectual Property and
Director of the United States Patent and Trademark Office*